United States Patent
Kuo (10) Patent No.: US 10,426,237 B2
(45) Date of Patent: Oct. 1, 2019

(54) TRANSPORTATION CASE AND BUCKLE STRUCTURE THEREOF

(71) Applicant: AIC INC., Taoyuan (TW)

(72) Inventor: Chung-I Kuo, Taoyuan (TW)

(73) Assignee: AIC INC., Taoyuan, Taiwan (CN)

( * ) Notice: Subject to any disclaimer, the term of this patent is extended or adjusted under 35 U.S.C. 154(b) by 370 days.

(21) Appl. No.: 15/430,525

(22) Filed: Feb. 12, 2017

(65) Prior Publication Data

US 2018/0228258 A1    Aug. 16, 2018

(51) Int. Cl.
*A45C 5/14* (2006.01)
*F16B 21/04* (2006.01)

(52) U.S. Cl.
CPC .............. *A45C 5/143* (2013.01); *F16B 21/04* (2013.01); *Y10T 403/7007* (2015.01); *Y10T 403/7015* (2015.01)

(58) Field of Classification Search
CPC . A45C 5/143; A45C 2005/148; F16B 5/0092; F16B 5/10; F16B 7/20; F16B 21/02; F16B 21/04; F16L 37/248; Y10T 403/7005; Y10T 403/7007; Y10T 403/7015
USPC .......................................... 403/348, 349, 353
See application file for complete search history.

(56) References Cited

U.S. PATENT DOCUMENTS

| | | | | |
|---|---|---|---|---|
| 582,022 A * | 5/1897 | Mason | ................... | F16L 37/248 285/238 |
| 919,743 A * | 4/1909 | Nixon | ................... | F16L 37/248 285/361 |
| 3,449,004 A * | 6/1969 | Anderson | ................ | F16B 5/10 403/408.1 |
| 5,169,260 A * | 12/1992 | Balemboy | .............. | B64G 1/641 403/349 |
| 5,871,335 A * | 2/1999 | Bartlett | ................. | F04D 29/263 403/349 |
| 6,254,303 B1 * | 7/2001 | Falat | ...................... | B23B 31/113 403/348 |
| 7,874,779 B2 * | 1/2011 | Csik | ........................ | F16B 21/04 411/553 |

(Continued)

FOREIGN PATENT DOCUMENTS

| | | | | |
|---|---|---|---|---|
| EP | 0791758 A1 * | 8/1997 | ................ | F16B 7/20 |
| GB | 2082243 A * | 3/1982 | ................ | F16B 5/10 |
| WO | WO-2016191805 A1 * | 12/2016 | ........... | B25B 27/062 |

*Primary Examiner* — Josh Skroupa
(74) *Attorney, Agent, or Firm* — Chun-Ming Shih; HDLS IPR Services (57) ABSTRACT

A buckle structure includes a buckling base and a buckling shaft. An axial hole is defined in the buckling base, an axial channel extending along an axial direction of the axial hole and a circumferential channel extending along a circumferential direction of the axial hole are defined on an internal surface of the axial hole, an opening is defined at an end of the axial channel and the other end of the axial channel communicates with the circumferential channel, the axial channel is provided with a movable block blocking between the axial channel and the circumferential channel and able to selectively retreat from the axial channel and the circumferential channel. The buckling shaft is inserted in the axial hole; a latch protruding from a lateral surface of an end of the buckling shaft is able to move through the opening and along the axial channel and the circumferential channel.

13 Claims, 9 Drawing Sheets

(56) References Cited

U.S. PATENT DOCUMENTS

| | | | | |
|---|---|---|---|---|
| 8,240,944 B2* | 8/2012 | Chang | ..................... | G09F 3/06 403/348 |
| 2011/0193342 A1* | 8/2011 | Hoefelmayr | .......... | F16L 37/248 285/377 |
| 2012/0227257 A1* | 9/2012 | Kalavitz | ................ | F16B 21/04 29/825 |

* cited by examiner

TRANSPORTATION CASE AND BUCKLE STRUCTURE THEREOF

BACKGROUND OF THE INVENTION

Technical Field

The present disclosure is related to transportation case, particularly to a transportation case for rapid assembly and disassembly and to a buckle structure thereof.

Description of Related Art

The present disclosure is related to a transportation case for server or an electronic device. Generally, an electronic device is provided with a transportation case with wheels for housing and for easy transportation. The wheels are idle after the electronic device is transported to a predetermined location. However, the wheels protruding on an external surface of the transportation case occupy additional installation space.

In views of this, in order to solve the above disadvantage, the present inventor studied related technology and provided a reasonable and effective solution in the present disclosure.

SUMMARY

A transportation case for rapid assembly and disassembly and a buckle structure thereof are provided in the present disclosure.

A buckle structure including a buckling base and a buckling shaft is provided in the present disclosure. An axial hole is defined in the buckling base, an axial channel and a circumferential channel are defined on an internal surface of the axial hole, the axial channel is extended parallel with an axial direction of the axial hole, the circumferential channel is extended parallel with a circumferential direction of the axial hole, an opening is defined on a surface of the buckling base and at an end of the axial channel and the other end of the axial channel is communicated with an end of the circumferential channel, a movable block is arranged in the axial channel, and the movable block is arranged intervene between the axial channel and the circumferential channel and able to move parallel with the axial direction of the axial hole to selectively retreat from the axial channel and the circumferential channel. The buckling shaft is inserted in the axial hole, a latch is arranged to protrude on a lateral surface at an end of the buckling shaft, and the latch is able to move through the opening and along the axial channel and the circumferential channel.

According to the buckle structure of the present disclosure, an elastic resetting member for pushing the movable block to intervene between the axial channel and the circumferential channel is arranged in the buckling base. A pressing plate is arranged in the axial hole, the movable block is configured to protrude on the pressing plate, and the elastic resetting member pushes against a surface of the pressing plate. A releasing linkage is inserted in the buckling shaft, two ends of the releasing linkage are respectively exposed from two ends of the buckling shaft, the releasing linkage is able to move along an axial direction of the buckling shaft and an end of the releasing linkage pushes against the other surface of the pressing plate.

According to the buckle structure of the present disclosure, a releasing linkage is inserted in the buckling shaft, two ends of the releasing linkage are respectively exposed from two ends of the buckling shaft, the releasing linkage is able to move along the axial direction of the buckling shaft and an end of the releasing linkage is linked with the movable block. A button is arranged on the other end of the releasing linkage. A pressing plate is arranged in the axial hole, the movable block is configured to protrude on the pressing plate, and the releasing linkage pushes against a surface of the pressing plate. A bearing is arranged to sleeve the buckling shaft, and a rim is arranged to sleeve the bearing. A turning handle is arranged to sleeve the buckling shaft.

A transportation case including aforementioned buckle structure and a case is further provided in the present disclosure, a recess is defined on an external surface of the case and a buckling base is arranged in the recess.

According to the transportation case of the present disclosure, another buckling base is arranged on an internal surface of the case. A door is pivoted to the case, and another buckling base is arranged on an internal surface of the door. A cover is arranged on the buckling shaft, the recess is covered by the cover while the buckling shaft is inserted in the buckling base.

According to the transportation case and buckle structure thereof of the present disclosure, accessories such as the rim or the cover are able to be assembled or disassembled by the buckling base and corresponding buckling shaft.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
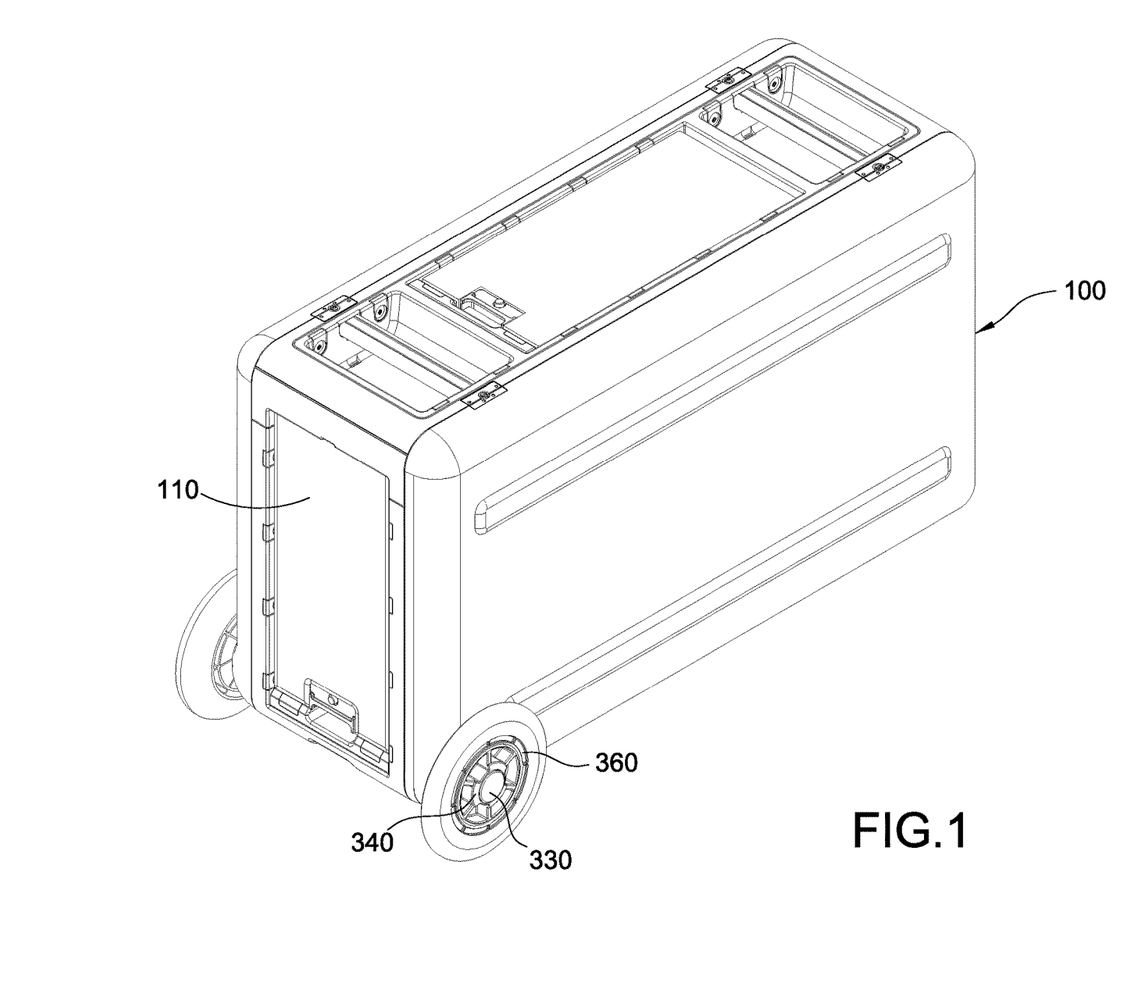
FIG. 1 is a perspective view showing the transportation case of an embodiment of the present disclosure.
Figure 2:
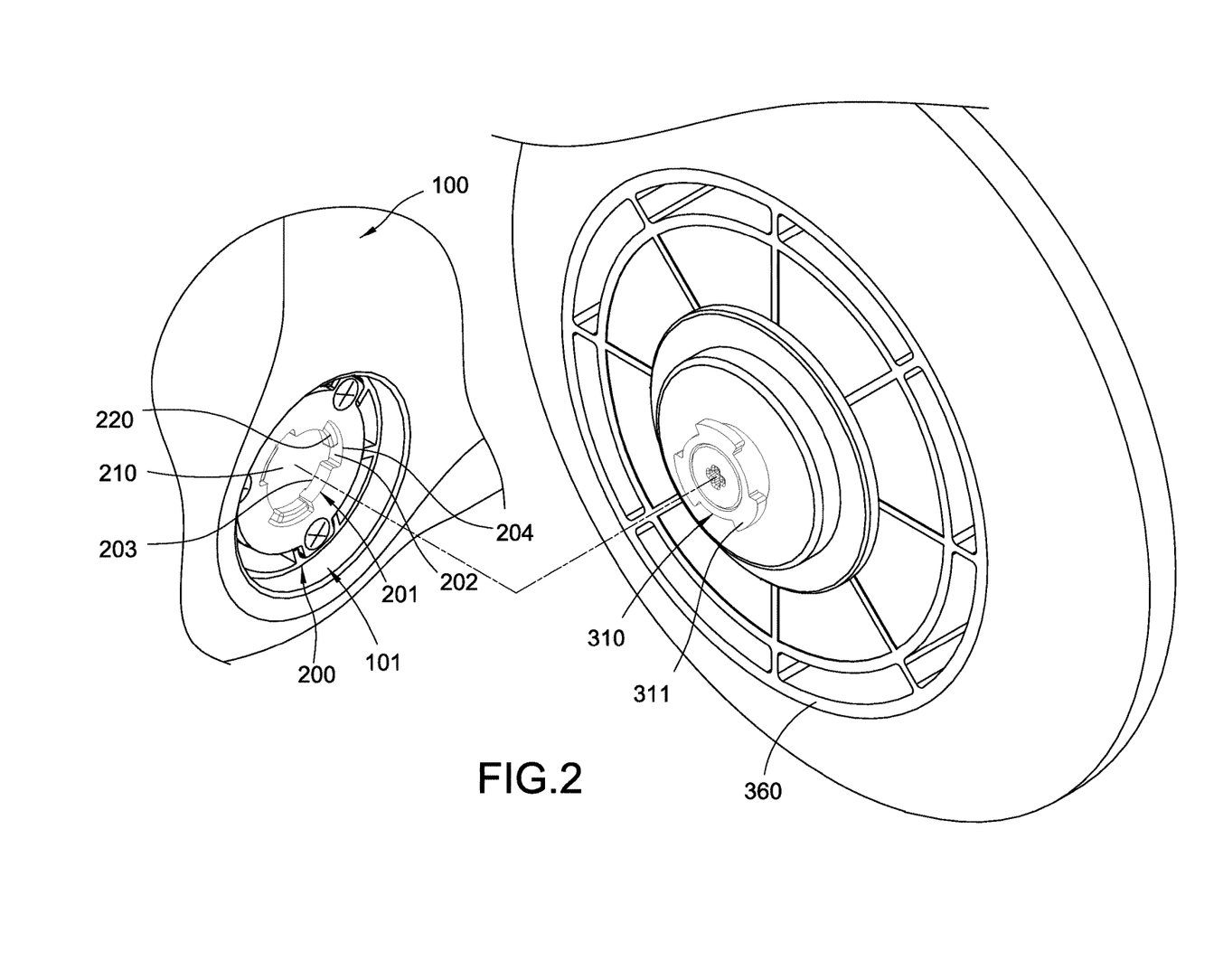
FIGS. 2 to 4 are exploded views showing the transportation case of the embodiment of the present disclosure.
Figure 3:
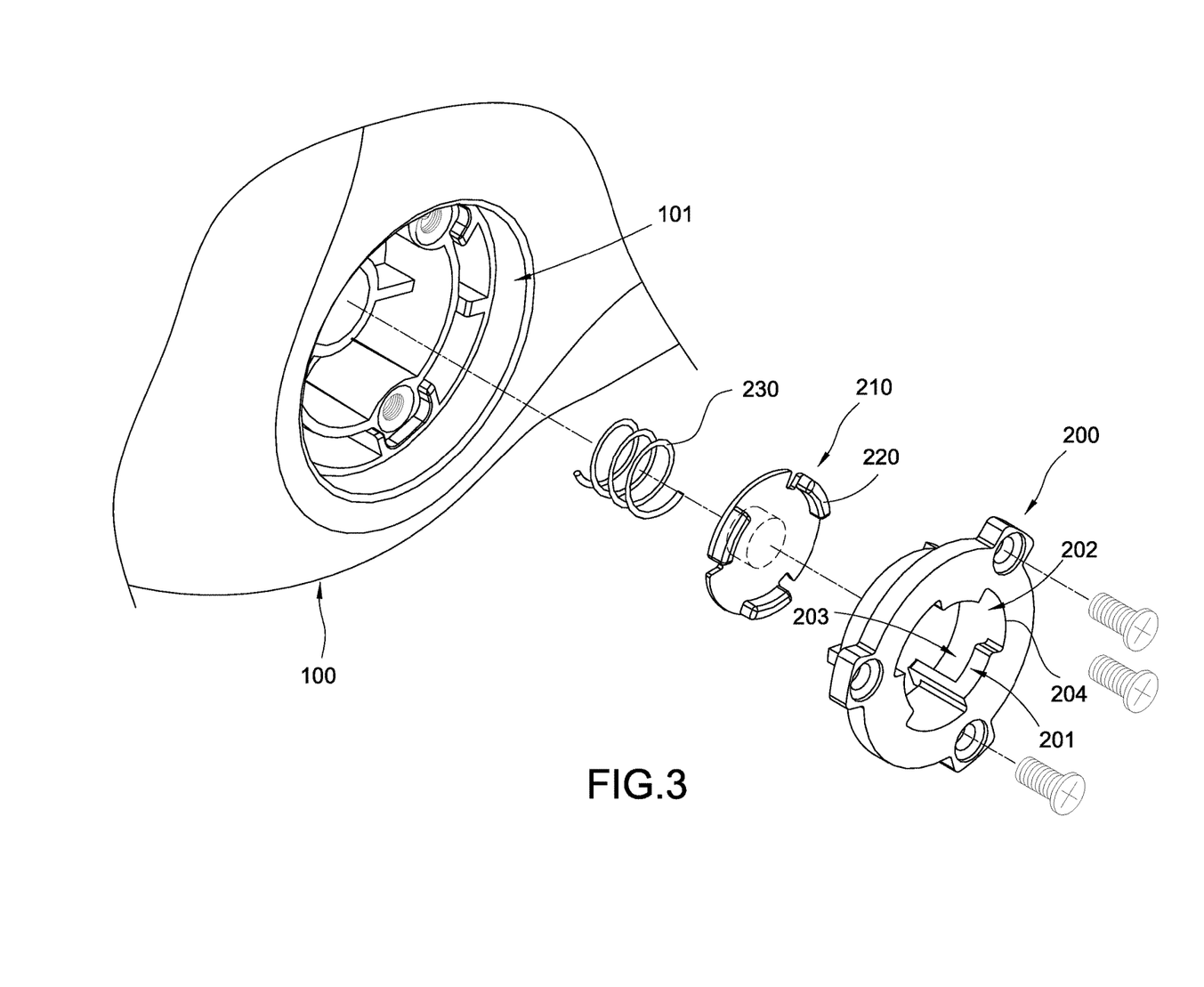
Figure 4:
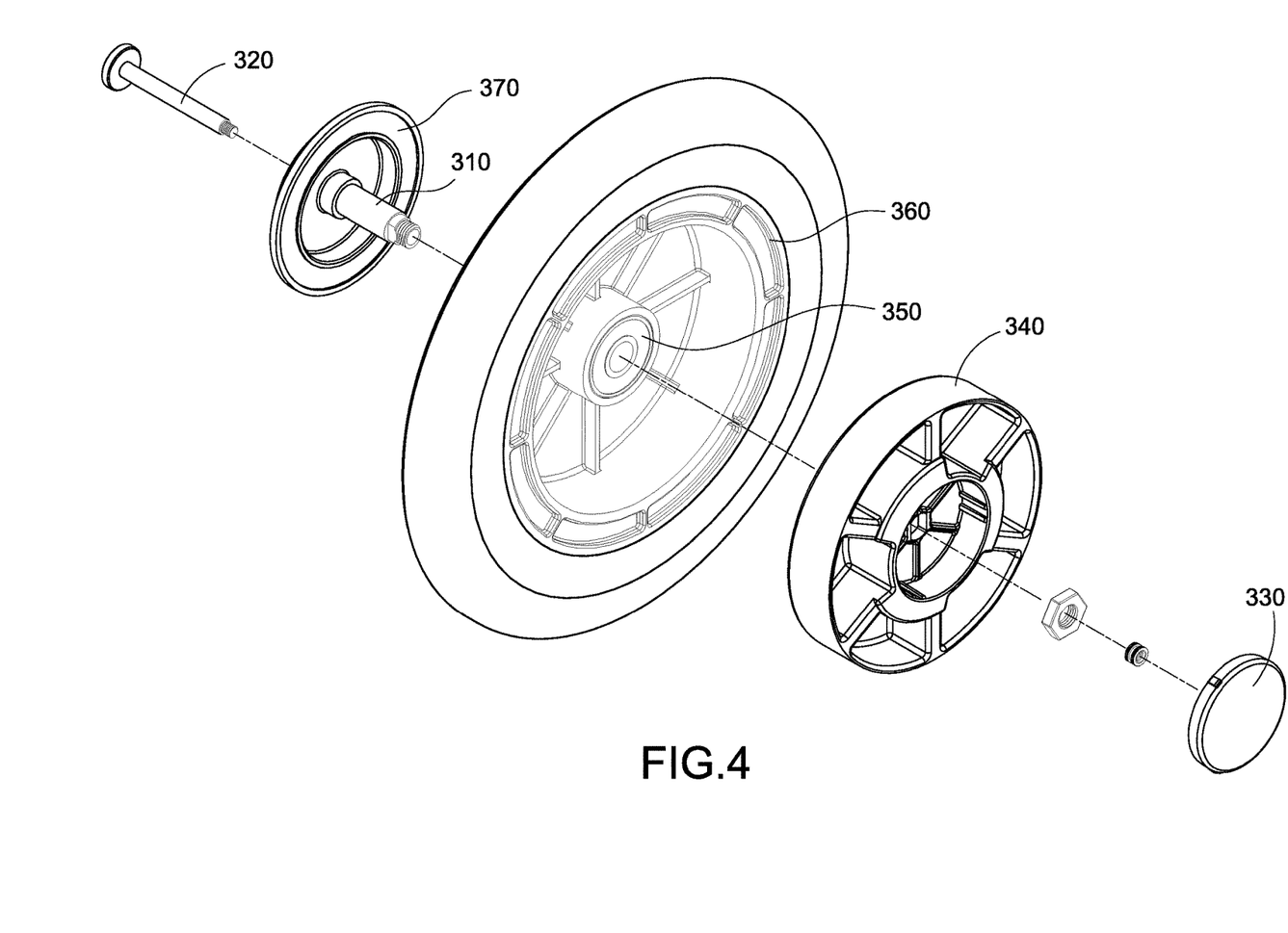

Please refer to FIGS. 1 and 2. A transportation case including a case 100 is provided in the present disclosure and a buckle structure is arranged on the case 100. The buckle structure includes at least a buckling base 200 and a buckling shaft 310 for coupling with the buckling base 200. In the present embodiment, a couple of buckling bases 200 the same with each other and a couple of corresponding buckling shafts 310 the same with each other are arranged on the case 100, but the number thereof should not be limited by the embodiment. Only a buckling base 200 and the corresponding buckling shaft 310 thereof are introduced below.

In the present embodiment, a recess 101 is defined to concave on an external surface of the case 100.

The buckling base 200 is fixed in the recess 101, and an axial hole 201 is defined in the buckling base 200. At least an axial channel 202 and a circumferential channel 203 communicated therewith are defined on an internal surface of the axial hole 201. In the present embodiment, three axial channels 202 the same with each other are defined on the internal surface of the axial hole 201, and correspondingly, three circumferential channels 203 the same with each other and communicated with respective axial channels 202 are defined on the internal surface of the axial hole 201, but the number thereof should not be limited by the embodiment. Each axial channel 202 is extended parallel with an axial direction of the axial hole 201, and an opening 204 is defined on an external surface of the buckling base 200 and at an end of the axial channel 202. Each circumferential channel 203 is extended parallel with a circumferential direction of the axial hole 201, an end of the circumferential channel 203 is preferably closed and the other end of the circumferential channel 203 is communicated with the other end of corresponding axial channel 202. A movable block 220 is arranged in each axial channel 202, each movable block 220 is con figured to intervene between the axial channel 202 containing the block 220 and the circumferential channel 203 and able to move parallel with the axial direction of the axial hole 201 to selectively retreat from the axial channel 202 containing the movable block 220 and the circumferential channel 203. In the present embodiment, a pressing plate 210 is preferably arranged in the axial hole 201, and three movable blocks 220 the same with each other are configured to protrude on the pressing plate 210, each movable block 220 is contained in corresponding axial channel 202, but the number thereof should not be limited by the embodiment. An elastic resetting member 230 for moving the movable block 220 to intervene between corresponding axial channel 202 and circumferential channel 203 is arranged in the recess 101. In the present embodiment, the elastic resetting member 230 is respectively contacted with the internal surface of the recess 101 and a surface of the pressing plate 210, and thereby able to move the movable blocks 220 simultaneously.

The buckling shaft 310 is of a tube shape and inserted in the axial hole 201, at least a latch 311 is arranged protruding on a lateral surface at an end of the buckling shaft 310. In the present embodiment three latches 311 the same with each other are arranged corresponding to the axial channels 202 and the circumferential channels 203, but the number thereof should not be limited by the embodiment. Each latch 311 is able to move through corresponding opening 204 into corresponding axial channel 202, and able to move along the axial channel 202 into communicated circumferential channel 203. a releasing linkage 320 is inserted in the buckling shaft 310 and the releasing linkage 320 is able to move along an axial direction of the buckling shaft 310, two ends of the releasing linkage 320 are respectively exposed from respective ends of the buckling shaft 310, a button 330 is arranged on an end of the releasing linkage 320 and the other end of the releasing linkage 320 pushes against the other surface of the pressing plate 210. Thereby the button 330 is able to be moved by the releasing linkage 320 while the pressing plate 210 is moved, and the movable blocks 220 are thereby able to be simultaneously retreat from respective corresponding axial channels 202 and circumferential channels 203. Furthermore, a turning handle 340 is arranged to sleeve the buckling shaft 310, and the turning handle 340 is thereby able to be to twist the buckling shaft 310 about the axial direction thereof to move the latch 311 into or out from the circumferential channel 203. A cover 370 is arranged on the buckling shaft 310, and the recess 101 is covered by the cover 370 while the buckling shaft 310 is inserted in the buckling base 200, to prevent the recess 101 from foreign object intrusion.

Figure 5:
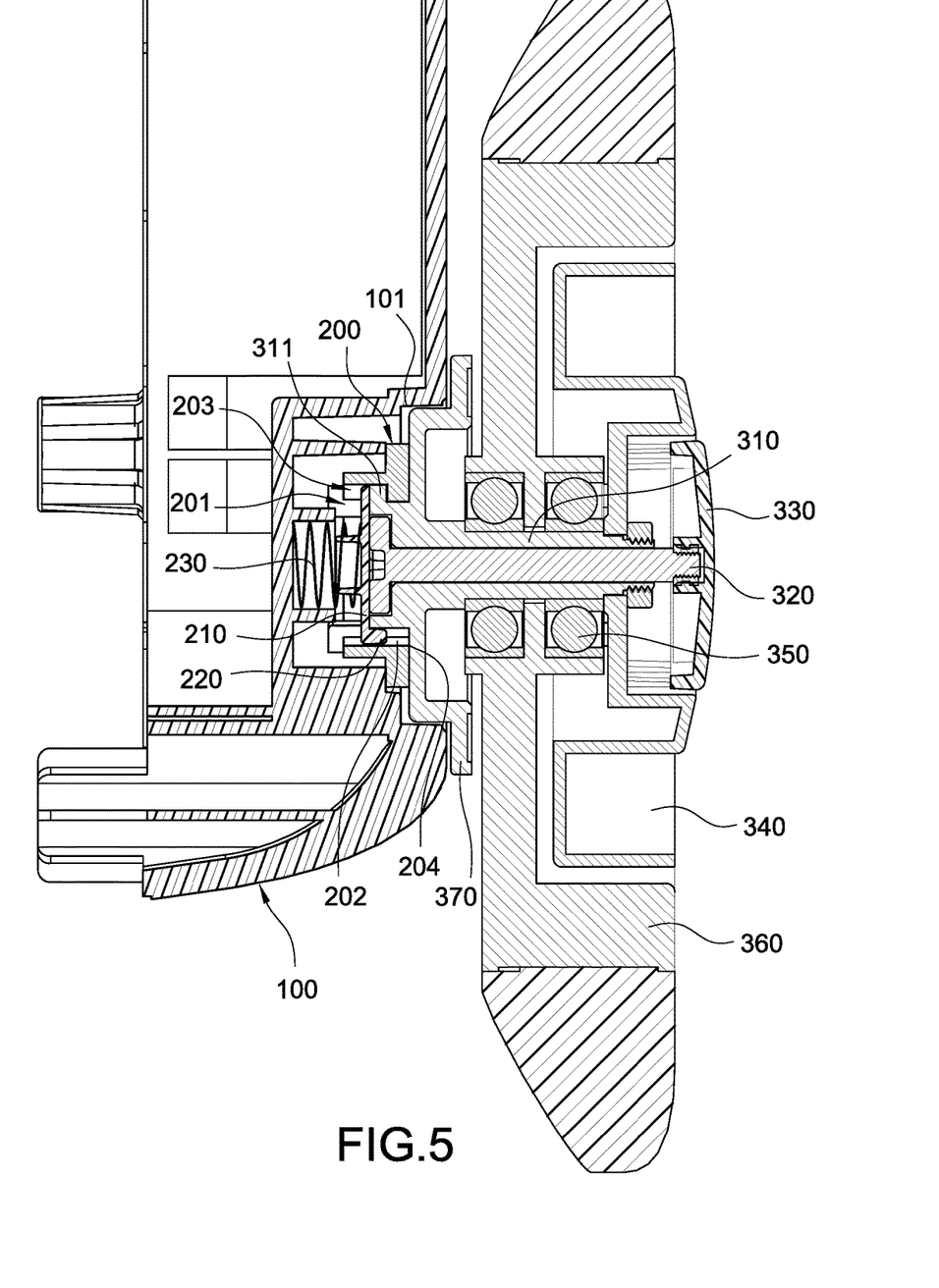
FIG. 5 is a cross sectional view showing the transportation case of the embodiment of the present disclosure.

Please refer to FIG. 5, the buckling shaft 310 is inserted into the axial hole 201 while assembling the buckling shaft 310 and the latches 311 are thereof able to move into corresponding axial channels 202 through respectively openings 204. While the buckling shaft 310 is inserted into the axial hole 201, respective latches 311 is able to push respective movable blocks 220 in respective axial channels 202 to retreat from respective axial channels 202 and respective circumferential channels 203. The buckling shaft 310 is twisted about the axial direction thereof by rotating the turning handle 340, and respective latches 311 are thereby pushed into corresponding circumferential channels 203. Respective latches 311 are retreated from respective movable blocks 220, and then the pressing plate 210 is moved by the elastic resetting member 230 to move back respective movable blocks 220 to intervene between respective axial channels 202 and respective circumferential channels 203. Thereby, respective latches 311 are fixed in corresponding circumferential channel 203 to fix the buckling shaft 310 with the buckling base 200.

Figure 6:
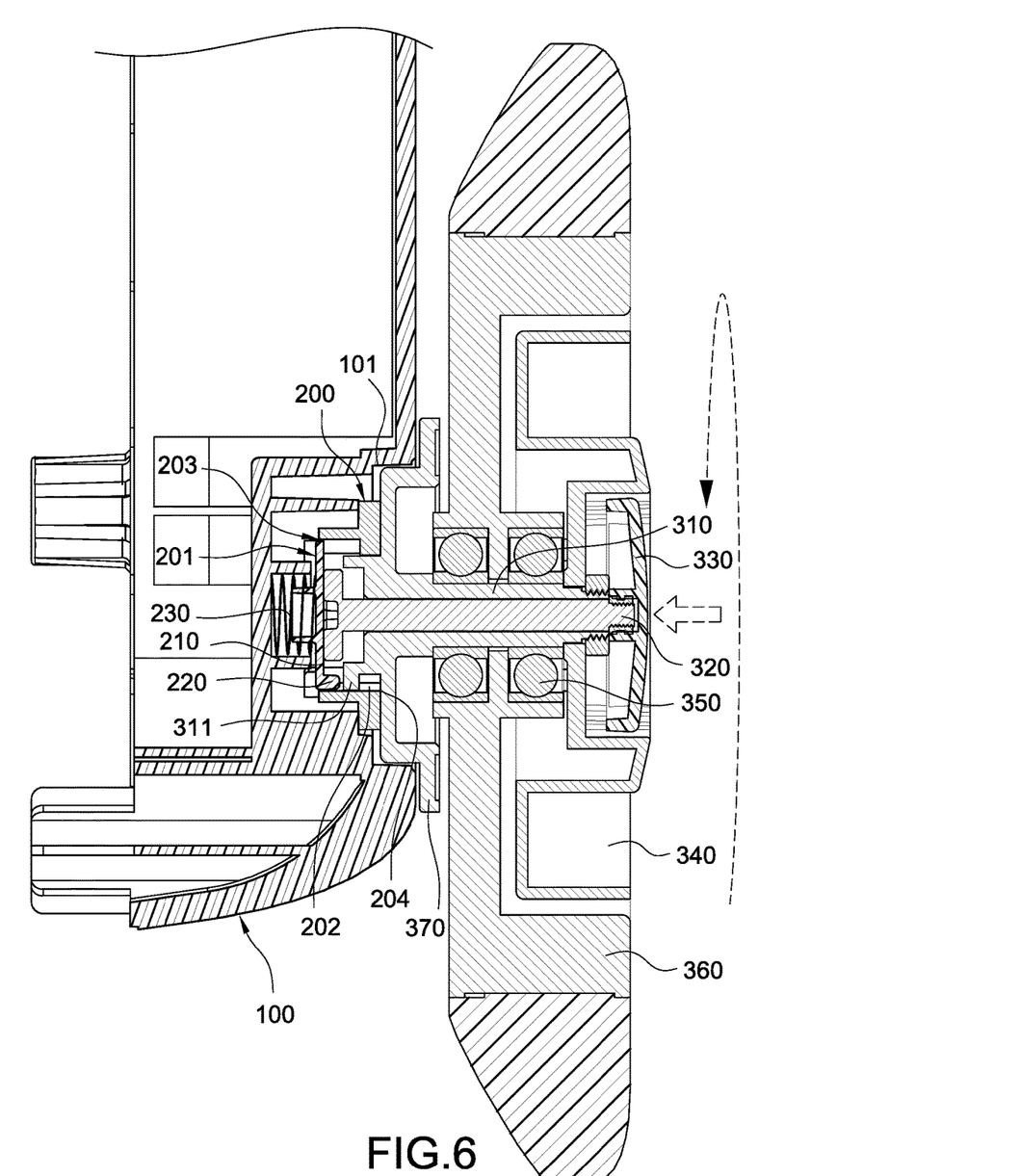
FIGS. 6 to 9 are schematic diagrams showing a usage of the transportation case of the embodiment of the present disclosure.
Figure 7:
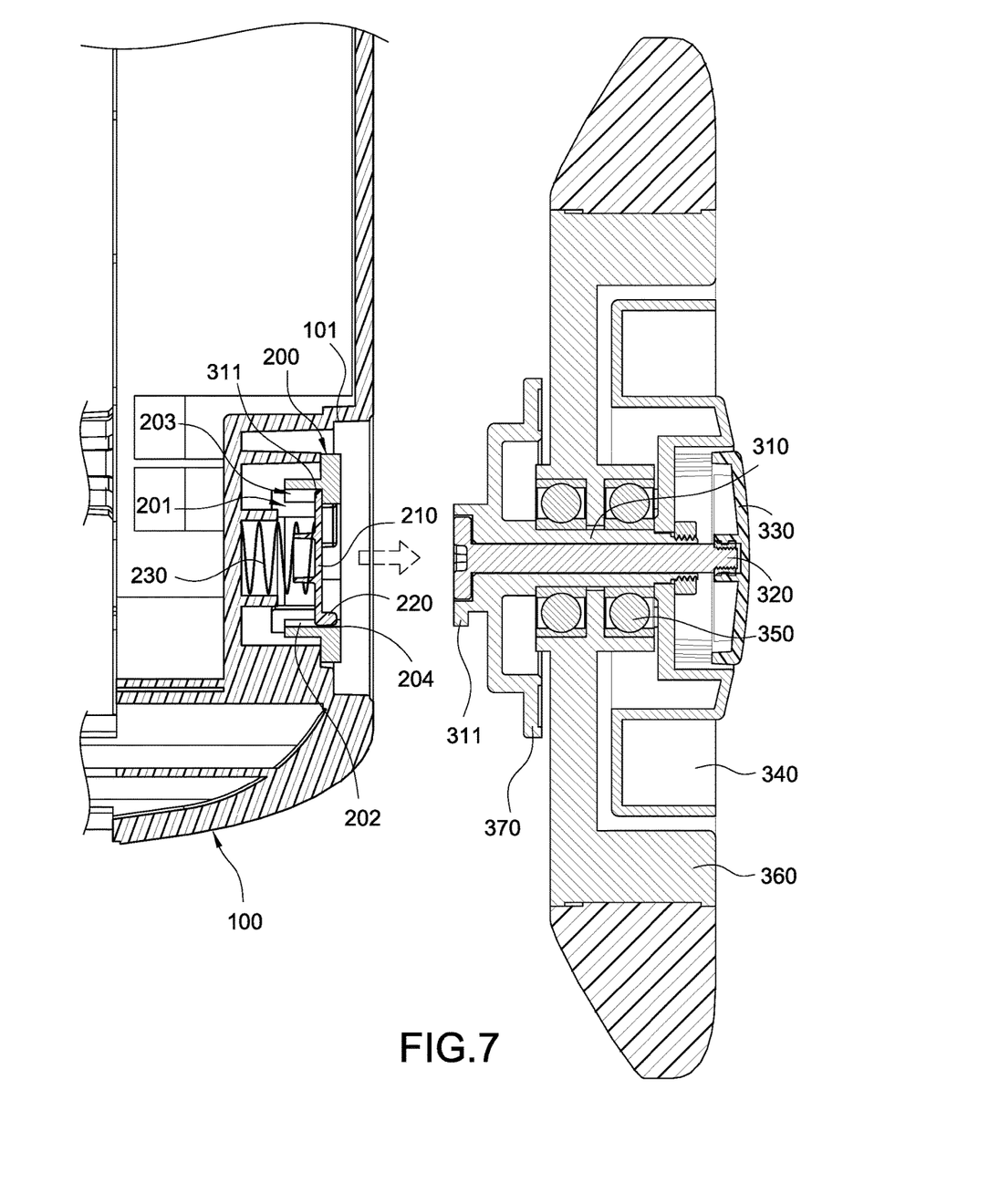

Please refer to FIGS. 6 and 7, while disassembling the buckling shaft 310, the pressing plate 210 is moved by the releasing linkage 320 by pressing the button 330, and respective movable blocks 220 are thereby simultaneously retreated from corresponding axial channels 202 and corresponding circumferential channels 203. Then, the buckling shaft 310 is twisted about the axial direction thereof by rotating the turning handle 340, and respective latches 311 are thereby retreated from respective circumferential channels 203 to release the buckling shaft 310.

Preferably, a bearing 350 is arranged to sleeve the buckling shaft 310, and a rim 360 is arranged to sleeve the bearing 350. Thereby, the rim 360 is able to be rapidly assembled onto the case 100 by the buckling shaft 310 and the case 100 is therefore easily for transportation and, the buckling shaft 310 is able to be disassembled from the case 100 to disassemble the rim 360.

Figure 8:
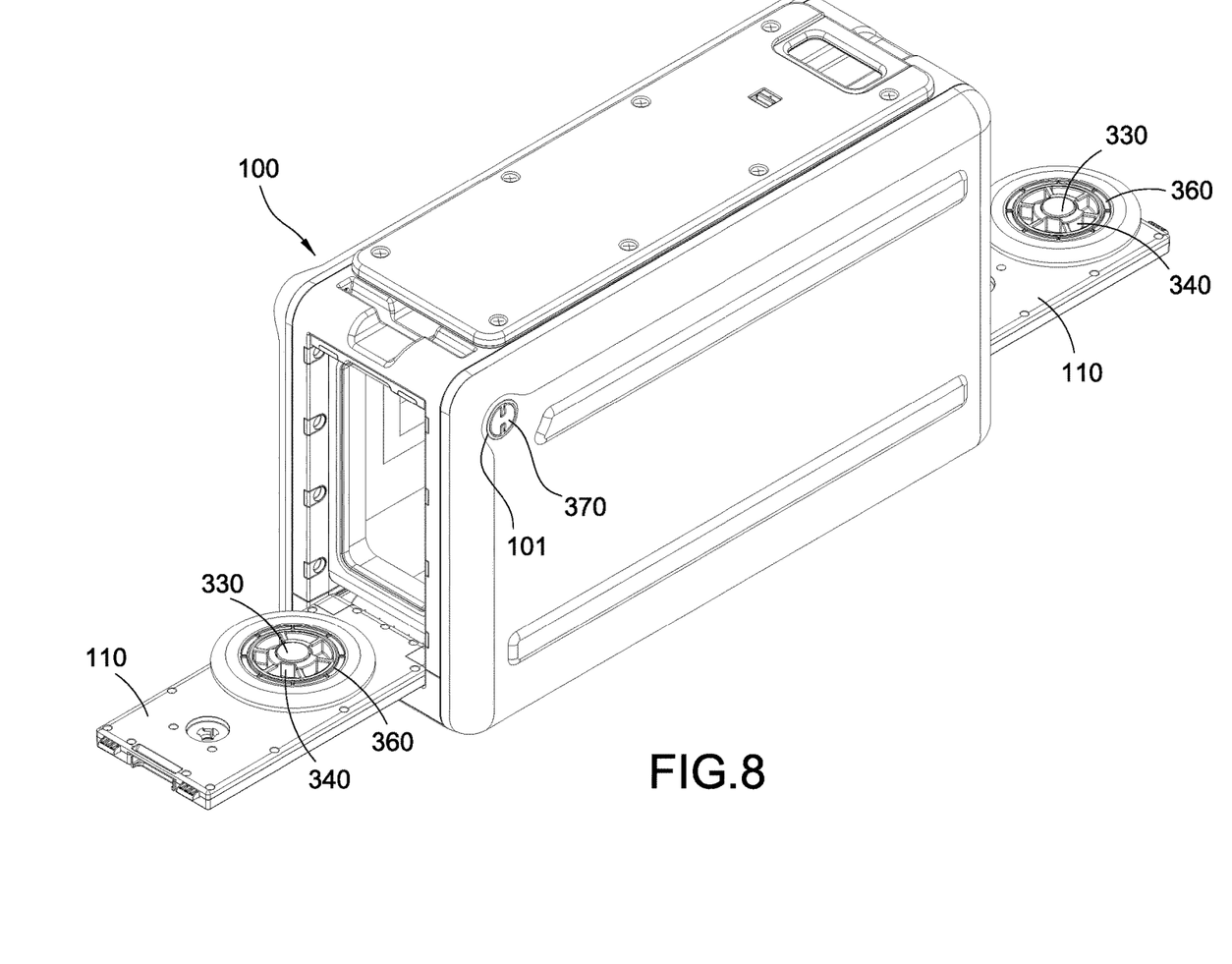

Please refer to FIG. 8, in the present embodiment, at least another buckling base 200 could be arranged on an internal surface of the case 100, a door 110 is preferably pivoted to the case 100, and the buckling base 200 could be selectively arranged on the internal surface of the door 110. Therefore, while the rim 360 is idle, the rim 360 could be connected to the buckling base 200 in the case 100 by the buckling shaft 310 and thereby contained in the case 100.

Figure 9:
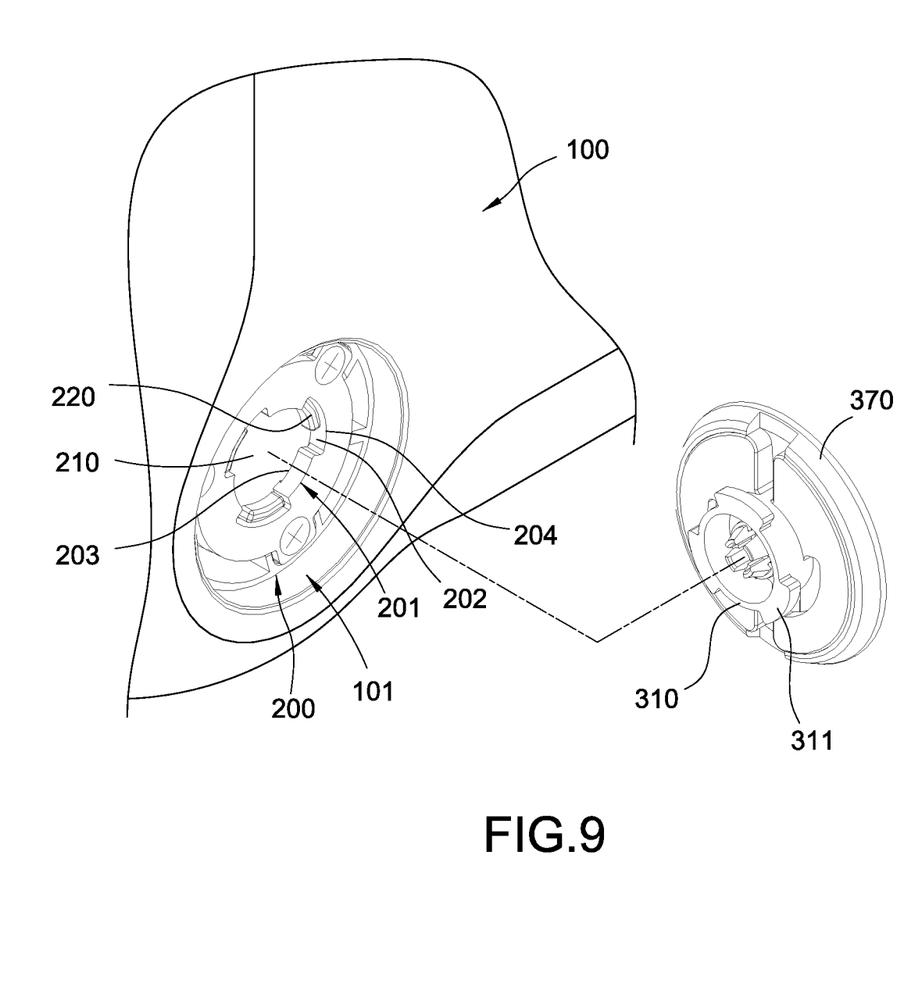

Please refer to FIG. 9, while the rim 360 the rim 360 is disassembled from the external surface of the case 100, another buckling shaft 310 only having the cover 370 and without the rim 360 could be arranged thereon, and the cover 370 is fixed with the buckling base 200 by the buckling shaft 310 to cover the recess 101 to prevent the recess 101 from foreign object intrusion.

What is claimed is:
1. A buckle structure, comprising:
a buckling base, an axial hole being defined in the buckling base, an axial channel and a circumferential channel being defined on an internal surface of the axial hole, the axial channel being extended parallel with an axial direction of the axial hole, the circumferential channel being extended parallel with a circumferential direction of the axial hole, an opening being defined on a surface of the buckling base at an end of the axial channel and the other end of the axial channel being communicated with an end of the circumferential channel, a movable block being arranged in the axial channel, the movable block being arranged to block between the axial channel and the circumferential channel and able to move parallel with the axial direction of the axial hole to selectively retreat from the axial channel and the circumferential channel; and
a buckling shaft inserted in the axial hole, a latch being arranged to protrude on a lateral surface at an end of the buckling shaft, the latch being able to move through the opening and along the axial channel and the circumferential channel.

2. The buckle structure according to claim 1, wherein an elastic resetting member for pushing the movable block to intervene between the axial channel and the circumferential channel is arranged in the buckling base.

3. The buckle structure according to claim 2, wherein a pressing plate is arranged in the axial hole, the movable block is arranged protruding on the pressing plate, and the elastic resetting member pushes against a surface of the pressing plate.

4. The buckle structure according to claim 3, wherein a releasing linkage is inserted in the buckling shaft, two ends of the releasing linkage are respectively exposed from the two ends of the buckling shaft, the releasing linkage is able to move along an axial direction of the buckling shaft and an end of the releasing linkage pushes against the other surface of the pressing plate.

5. The buckle structure according to claim 2, wherein a releasing linkage is inserted in the buckling shaft, two ends of the releasing linkage are respectively exposed from the two ends of the buckling shaft, the releasing linkage is able to move along an axial direction of the buckling shaft and an end of the releasing linkage is linked with the movable block.

6. The buckle structure according to claim 5, wherein a button is arranged at the other end of the releasing linkage.

7. The buckle structure according to claim 5, wherein a pressing plate is arranged in the axial hole, the movable block is arranged protruding on the pressing plate, and the releasing linkage pushes against a surface of the pressing plate.

8. The buckle structure according to claim 1, wherein a bearing sleeves the buckling shaft and a rim sleeves the bearing.

9. The buckle structure according to claim 1, a turning handle sleeves the buckling shaft.

10. A transportation case, comprising the buckle structure according to claim 1 and a case, a recess being defined on an external surface of the case and the buckling base being arranged in the recess.

11. The transportation case according to claim 10, wherein another buckling base is arranged on an internal surface of the case.

12. The transportation case according to claim 10, wherein a door is pivoted to the case and another buckling base is arranged on an internal surface of the door.

13. The transportation case according to claim 10, wherein a cover is arranged on the buckling shaft, the recess is covered by the cover while the buckling shaft is inserted in the buckling base.

* * * * *